(12) United States Patent
Paila

(10) Patent No.: US 9,277,485 B2
(45) Date of Patent: Mar. 1, 2016

(54) METHOD OF TRANSMITTING AND ACCESSING NETWORK SERVICE DATA

(75) Inventor: Toni Paila, Degerby (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1410 days.

(21) Appl. No.: 12/206,000

(22) Filed: Sep. 8, 2008

(65) Prior Publication Data

US 2009/0031362 A1 Jan. 29, 2009

Related U.S. Application Data

(63) Continuation of application No. 09/988,921, filed on Nov. 19, 2001, now Pat. No. 7,426,393.

(51) Int. Cl.
| | | |
|---|---|---|
| H04W 48/10 | (2009.01) | |
| H04N 21/262 | (2011.01) | |
| H04N 21/2668 | (2011.01) | |
| H04N 21/65 | (2011.01) | |
| H04N 21/6587 | (2011.01) | |
| H04N 21/6336 | (2011.01) | |
| H04N 21/63 | (2011.01) | |
| H04N 21/6332 | (2011.01) | |
| H04W 48/12 | (2009.01) | |
| H04W 88/06 | (2009.01) | |

(52) U.S. Cl.
CPC ............. *H04W 48/10* (2013.01); *H04N 21/262* (2013.01); *H04N 21/2668* (2013.01); *H04N 21/63* (2013.01); *H04N 21/6332* (2013.01); *H04N 21/6336* (2013.01); *H04N 21/65* (2013.01); *H04N 21/6587* (2013.01); *H04W 48/12* (2013.01); *H04W 88/06* (2013.01)

(58) Field of Classification Search
USPC .......................................................... 725/114
See application file for complete search history.

(56) References Cited

U.S. PATENT DOCUMENTS

| | | | | |
|---|---|---|---|---|
| 3,975,583 | A | * 8/1976 | Meadows | ...................... 348/460 |
| 5,459,458 | A | 10/1995 | Richardson et al. | |
| 5,608,446 | A | * 3/1997 | Carr et al. | ..................... 725/114 |

(Continued)

FOREIGN PATENT DOCUMENTS

| | | |
|---|---|---|
| WO | WO9111868 | 8/1991 |
| WO | 9512936 A1 | 5/1995 |

(Continued)

OTHER PUBLICATIONS

Office Action for corresponding Indian Patent Application No. 1339/CHENP/2004 dated Apr. 24, 2009, pp. 1-2.

(Continued)

*Primary Examiner* — Justin Shepard
(74) *Attorney, Agent, or Firm* — Ditthavong & Steiner, P.C.

(57) ABSTRACT

A method of transmitting and accessing announcement information identifying available services. Services are provided on the network over a plurality of communication channels, such that each channel is associated with at least one service. At least one of the plurality of communication channels is dedicated as an all-announcement channel, which includes a service announcement for each one of the services available on the plurality of communication channels. Redirection information is also present on the plurality of communication channels and is used to redirect the mobile terminal to the all-announcement channel to obtain information concerning the available services.

60 Claims, 8 Drawing Sheets

(56) References Cited

U.S. PATENT DOCUMENTS

| | | |
|---|---|---|
| 5,799,251 A | 8/1998 | Paavonen |
| 5,909,651 A | 6/1999 | Chander et al. |
| 5,999,216 A | 12/1999 | Kaars |
| 6,061,095 A | 5/2000 | Van Gestel |
| 6,100,884 A | 8/2000 | Tomita et al. |
| 6,108,706 A | 8/2000 | Birdwell et al. |
| 6,122,660 A | 9/2000 | Baransky et al. |
| 6,128,490 A | 10/2000 | Shaheen et al. |
| 6,163,345 A | 12/2000 | Noguchi et al. |
| 6,192,340 B1 | 2/2001 | Abecassis |
| 6,233,736 B1 | 5/2001 | Wolzien |
| 6,301,609 B1 | 10/2001 | Aravamudan et al. |
| 6,351,647 B1 | 2/2002 | Gustafsson |
| 6,463,585 B1 | 10/2002 | Hendricks et al. |
| 6,519,455 B1 | 2/2003 | McCormick et al. |
| 6,532,368 B1 | 3/2003 | Hild et al. |
| 6,650,905 B1* | 11/2003 | Toskala et al. ............... 455/522 |
| 6,697,651 B2* | 2/2004 | Li .................................. 455/574 |
| 7,124,356 B1* | 10/2006 | Alsafadi et al. ............... 715/239 |
| 2001/0014611 A1 | 8/2001 | Dufort |
| 2002/0009993 A1 | 1/2002 | Dastrup et al. |
| 2002/0077077 A1 | 6/2002 | Rezvani et al. |
| 2002/0102967 A1 | 8/2002 | Chang et al. |
| 2002/0136390 A1 | 9/2002 | Lang et al. |
| 2002/0145680 A1* | 10/2002 | Hong ............................ 348/725 |
| 2002/0167921 A1 | 11/2002 | Vakil et al. |
| 2002/0187784 A1 | 12/2002 | Tigerstedt et al. |
| 2003/0003909 A1 | 1/2003 | Keronen et al. |
| 2003/0003964 A1 | 1/2003 | Wroblewski |
| 2003/0016702 A1 | 1/2003 | Bender et al. |
| 2003/0133043 A1* | 7/2003 | Carr .............................. 348/563 |
| 2003/0142757 A1 | 7/2003 | Kahlman et al. |
| 2004/0036611 A1* | 2/2004 | Kidney et al. ............. 340/573.1 |

FOREIGN PATENT DOCUMENTS

| | | |
|---|---|---|
| WO | 9922539 A1 | 5/1999 |
| WO | WO9922539 | 5/1999 |
| WO | W00180579 | 10/2001 |
| WO | WO0174108 | 10/2001 |
| WO | WO0176286 | 10/2001 |

OTHER PUBLICATIONS

ISO/IEC 138181 "Information technology—Generic coding of moving pictures and associated audio information—Part 1: Systems", Nov. 13, 1994, 153 pages.

Finlayson, R., "Describing Session Directories in SDP" (Internet Draft) IETF, Jan. 2001, 4 pages.

Santos, A. et al., "Towards multicast session directory services", 7 pages.

Handley, M. et al., "Session Announcement Protocol" (RFC 2974) IETF, Oct. 2000, 17 pages.

Handley, M. et al., "SDP: Session Description Protocol" (RFC 2327) IETF, Apr. 1998, 40 pages.

EN 300 468 V1.4.1, "Specification for Service Information (SI) in DVB systems", ETSI, Nov. 2000, 83 pages.

Perkins, C., "IP Mobility Support" (RFC 2002) IETF, Oct. 1996, 74 pages.

European Office Action for related European Application No. 02803487.4-1505 dated Feb. 18, 2015, 6 pages.

* cited by examiner

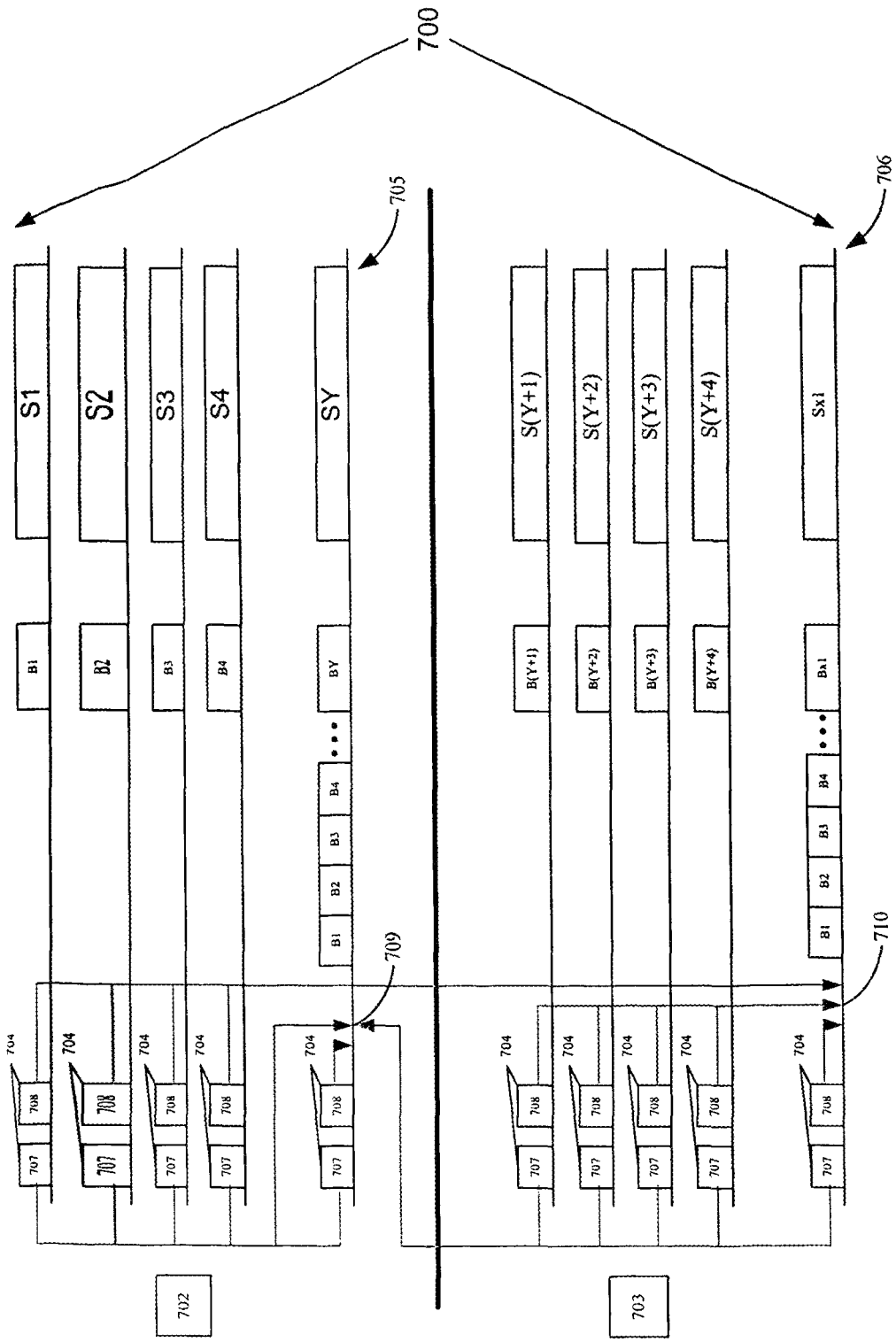

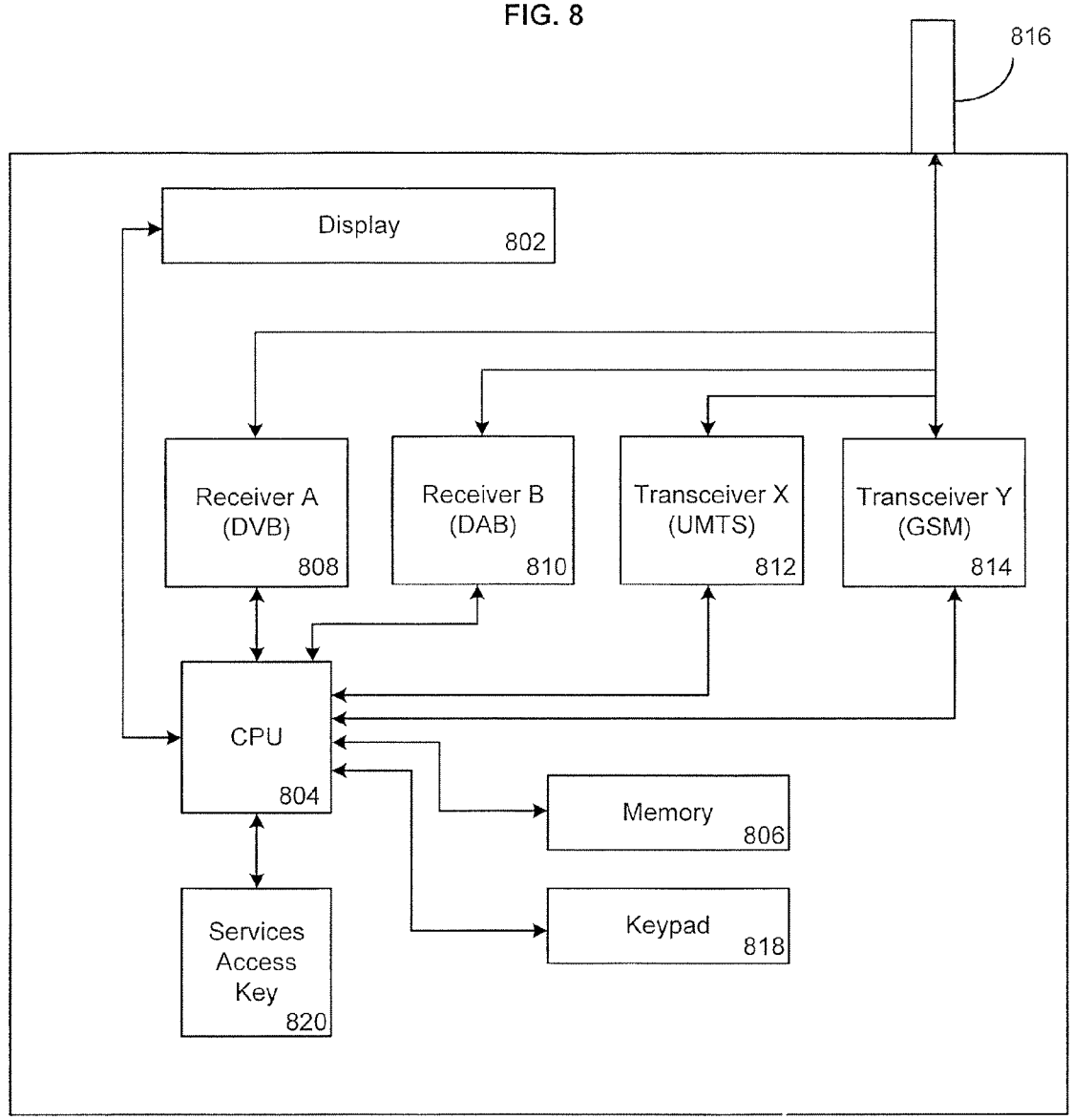

METHOD OF TRANSMITTING AND ACCESSING NETWORK SERVICE DATA

RELATED APPLICATION INFORMATION

This application is a continuation application of co-pending U.S. application Ser. No. 09/988,921 filed Nov. 19, 2001, which is incorporated herein by reference.

FIELD OF THE INVENTION

The present invention relates to the transmission of network service data to a mobile terminal and more particularly, to the transmission of service data to mobile terminals in a multi-bearer network.

BACKGROUND OF THE INVENTION

A multi-bearer network ("MBN"), is a network having the capability to transmit a data packet via one of several alternative bearer network types to mobile terminals. Each mobile terminal is preferably able to communicate with a plurality of bearer networks ("BN"). The bearer networks are known to one skilled in the art and typically comprise at least one bi-directional bearer network (e.g., GSM, GPRS, UMTS, WLAN, Bluetooth, etc.) and at least one unidirectional or broadcast bearer network (e.g., DAB, DVB, etc.). The DAB and DVB broadcast bearer networks are commonly referred to as DxB. The DxB networks are the principal bearer networks for down-link traffic. A mobile terminal uses the bi-directional (up-link) bearer network primarily for accessing the services of the DxB networks, although some bi-directional bearer network, most notably UMTS, can be used for down-link traffic at a moderately high speed. Moreover, the other bi-directional bearer networks mentioned above may be used to transmit services that do not require significant bandwidth. The bearer networks are geographically overlapping, and a mobile terminal may have access to all bearer networks simultaneously. MBN's are well-known and described in detail in WO 01/76286 A1, entitled "Architecture and Packet Routing in a Multi-Bearer Type Network" and WO 01/74108 A1, entitled "Handover in a Wireless Mobile IP Network", copies of which are incorporated herein by reference.

FIG. 1 shows an exemplary bearer network A 100a and an exemplary bearer network B 100b of a Multi-Bearer Network 100 (MBN), having at least one transmitter 102a for use in transmitting service data from bearer network A 100a, and having at least one transmitter 102b for use in transmitting service data from bearer network B 100b, to at least one mobile terminal 104. Service data may include streaming MP3 data, periodically updated weather reports sent over IP, IP services such as multicast services or unicast services, cell to session mappings or IP component mappings, or the like. Bearer network A 100a packetizes its respective service data and sends it (step 101a) to at least one transmitter 102a for transmission to the mobile terminal 104 in a manner well known to those skilled in the art. Additionally, bearer network B 100b also packetizes its respective service data and sends it (step 101b) to at least one transmitter 102b for transmission to the mobile terminal 104 in a manner well known to those skilled in the art. The mobile terminal 104 may be capable of receiving packetized service data from only a single bearer in the network or, alternatively, may be a "hybrid" terminal capable of receiving packetized service data from a plurality of bearer networks in a MBN 100.

Each multi bearer network 100 that transmits service data, typically does so on a plurality of channels, where each service is assigned to a particular channel. A channel may be a frequency, a program identifier ("PID"), a media access control ("MAC") address, or the like. In addition to the service data, the multi bearer network 100 also transmits service announcements to enable a mobile terminal 104 to identify the service that a multi-bearer network 100 is transmitting on a channel. Several methods of transmitting service announcements have been proposed. FIG. 2 illustrates one such method, wherein a multi-bearer network 100 uses X channels 200 to transmit service data to a mobile terminal 104. It is assumed that each mobile terminal 104 initially tunes to a random channel upon powering up. The channel may be a specific frequency, but need not be so limited. As shown in FIG. 2, for each channel, a service "S" and a service announcement "A" identifying the service transmitted on the same channel. In other words, the service $S_1$ and the service announcement $A_1$ identifying $S_1$ are transmitted on channel 1, the service $S_2$ and the service announcement $A_2$ identifying $S_2$, are transmitted on channel 2, etc. In order to identify the services available on all X channels 200, the mobile terminal 104 will tune to a first channel, access the service announcement on that channel, identify the service available on that channel, and then tune to another channel to determine the service available on that channel. This process of tuning, accessing and re-tuning is repeated until all channels carrying services that the mobile terminal 104 is able to receive have been tuned to, and their respective services identified. Assuming that it requires "Y" seconds to identify the services available on a given channel, and that it requires "T" seconds to jump from one channel to another channel, then the total learning time "t" for the mobile terminal 104 to identify all of the services available is $t=X*(Y+T)$ seconds.

FIG. 3, illustrates another exemplary method of transmitting service announcements. As shown in FIG. 3, a multi-bearer network 100 uses X channels 300 to transmit service data to a mobile terminal 104. As in the previous method, the mobile terminal 104 initially tunes to a random channel upon powering on. Unlike the previous method, however, one channel contains all of the service announcements, $A_1$ through $A_X$, for all X channels 300 that provide a service, $S_1$ through $S_X$, respectively. This channel is referred to as the "all-announcement" channel 301. The probability that the mobile terminal 104 will randomly select the all-announcement channel 301 is 1/X, assuming that the process of selecting a frequency is truly random. As in the method of FIG. 2, the mobile terminal 104 tunes to each channel for Y seconds to determine if it has tuned to the all-announcement channel 301. The time required for the mobile terminal 104 to tune from one channel to another channel is T seconds. Therefore, the minimum learning time, defined as "$t_{min}$", is greater than or equal to Y seconds, and the maximum learning time, "$t_{max}$" is less than or equal to $X*(Y+T)$ seconds. Taking the average of $t_{min}$ and $t_{max}$ to be the expected learning time for the mobile terminal 104 to identify the all-announcement channel 301, the expected learning time is $(Y+X*(Y+T))/2$. This, however, results in only a marginal improvement in minimizing the expected learning time.

FIG. 4 illustrates yet another exemplary method of transmitting service announcements. In FIG. 4, there are X channels 400. Each channel, however, contains the service announcements, $A_1$ through $A_X$, for all of the services $S_1$ through $S_X$ provided on the X channels. In other words, channel 1 contains the service announcements, $A_1$ through $A_X$, for channel 1 through channel X respectively, along with the service $S_1$ for channel 1, channel 2 contains the service announcements, $A_1$ through $A_X$, for channel 1 through channel X, along with the service $S_2$ for channel 2, etc. Therefore, the channel that the mobile terminal 104 initially selects upon being powered on will contain all of the necessary service announcements. This eliminates the additional learning time associated with the methods discussed above in connection with FIGS. 2 and 3. However, in the method of FIG. 4, the additional bandwidth that the service announcements, $A_1$ through $A_x$, consume is significant, as can readily be seen by comparing FIGS. 2-4.

Solutions other than those discussed above are less automated. For example, in many European countries, such as Italy, upon leaving from an airplane and turning on a mobile phone, the user will receive an SMS message from the network operator such as "Call 12233 to get information on services in Italy". The user can then call the number provided to receive information on the available services.

It is clear that there is a need to overcome the inefficiency of the aforementioned methods.

SUMMARY OF THE INVENTION

The above-identified problems are solved and a technical advance is achieved in the art by providing a system and method providing service announcement information to a mobile terminal.

An exemplary method of providing service announcement information includes: transmitting a service on a first channel; and transmitting pointer data on the first channel, wherein the pointer data identifies a second channel on which a service announcement identifying the service transmitted on the first channel is located.

In another embodiment, an exemplary method of providing service announcement information includes: transmitting a service on each of a plurality of channels; and transmitting pointer data on each of the plurality of channels, wherein the pointer data identifies a channel containing a plurality of service announcements identifying the services transmitted on each of the plurality of channels.

In yet another embodiment, an exemplary method of providing service announcement information includes: transmitting a service using a first protocol together with first pointer data on each of a first plurality of channels, the first pointer data identifying a first channel containing a plurality of service announcements identifying the services transmitted on each of the first plurality of channels; and transmitting a service using a second protocol together with second pointer data on each of a second plurality of channels, the second pointer data identifying a second channel containing a plurality of service announcements identifying the services transmitted on each of the second plurality of channels.

In an additional embodiment, an exemplary method of providing a service announcement includes: transmitting a service using a first protocol on each of a first plurality of channels; transmitting pointer data on each of the first plurality of channels; transmitting a service using a second protocol on each of a second plurality of channels; and transmitting pointer data on each of the second plurality of channels, wherein the pointer data identifies a channel containing a plurality of service announcements identifying the services transmitted on the first plurality of channels and on the second plurality of channels.

In another additional embodiment, an exemplary method of accessing a communication channel from a plurality of communication channels within a network with a mobile terminal capable of receiving at least one signal from at least one of the communications channels within the network includes: identifying at least one communication channel that is transmitting signals receivable by the mobile terminal; accessing a first communication channel that is transmitting at least one signal receivable by the mobile terminal; receiving first signals from the first communications channel; searching in the first signals for redirection information; selecting and accessing a second communication channel from the plurality of communication channels based on the redirection information, if the redirection information is received within a first period of time; and selecting and accessing a third communication channel if the redirection information is not received within the first period of time.

In yet another additional embodiment, an exemplary method of accessing a communications frequency from a plurality of communications frequencies within a network with a mobile terminal capable of receiving at least one signal from at least one of the communications frequencies within the network includes: identifying at least one communication frequency that is transmitting signals receivable by the mobile terminal; accessing a first communication frequency that is transmitting at least one signal receivable by the mobile terminal; receiving first signals from the first communications frequency; searching in the first signals for redirection information; selecting and accessing a second communication frequency from the plurality of communication channels based on redirection information, if the redirection information is received within a first period of time; and selecting and accessing a third communication frequency if the redirection information is not received within the first period of time.

Other and further aspects of the present invention will become apparent during the course of the following description and by reference to the attached drawings.

BRIEF DESCRIPTION OF THE DRAWINGS

Further aspects of the instant invention will be more readily appreciated upon review of the detailed description of the preferred embodiments included below when taken in conjunction with the accompanying drawings, of which:

FIG. 7 illustrates the transmission of service announcements over a multi-bearer network in accordance with another embodiment of the present invention.

FIG. 8 depicts a block diagram of an exemplary mobile terminal structure for receiving service announcement information over a multi-bearer network.

DETAILED DESCRIPTION OF THE INVENTION

Referring now to FIGS. 5-8, wherein similar components are referenced in like manner, various embodiments of a method for transmitting and receiving service announcements over a multi-bearer network 100 are disclosed.

Figure 5:
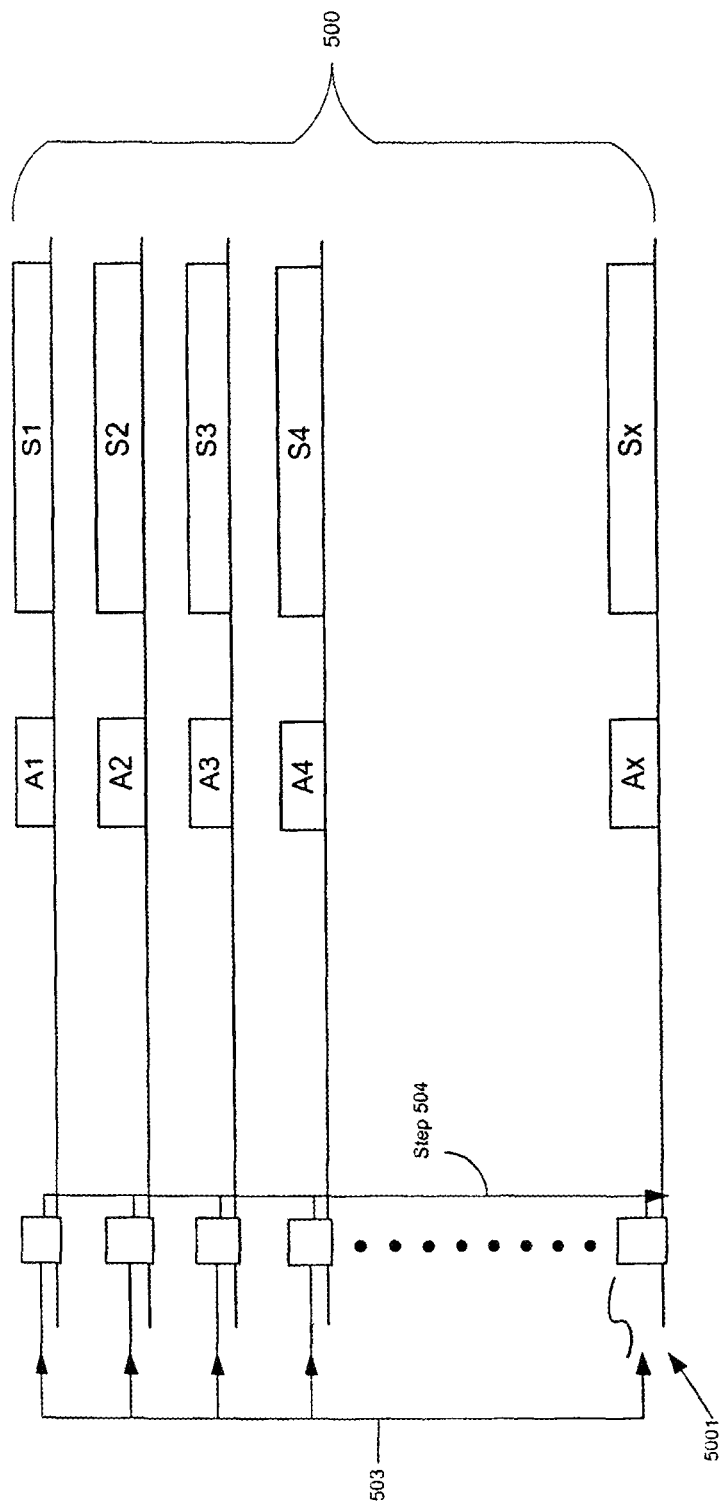
FIG. 5 illustrates an exemplary method of transmitting service announcements in accordance with one embodiment of the present invention.

FIG. 5 illustrates an exemplary method of transmitting service announcements in accordance with one embodiment of the present invention. As shown in FIG. 5, a multi-bearer network transmits services $S_1$ through $S_X$ on channels 1 through X, respectively, together with service announcements $A_1$ through $A_X$, respectively. A service may include streaming MP3 data, periodically updated weather reports sent over IP, IP services such as multicast services or unicast services, cell to session mappings or IP component mappings, or the like.

It should be understood, however, that not every channel need be allocated a service, and in addition, that every channel need not include an announcement message identifying the service available on that channel. In addition, the multi-bearer network 100 also transmits redirection information 503 on each of channels 1 through X as will be discussed in detail hereinafter. A mobile terminal 104 is that is equipped with the capability to receive transmissions from the multi-bearer network 100 randomly tunes to a channel from the X available channels 500 when powered on. Moreover, one of the channels 1 through X (in FIG. 5, channel X) is an "all-announcement" channel 5001, which includes a transmission of all the service announcements $A_1$ through $A_X$ for all of the services $S_1$ through $S_X$ available on channels 1 through X. Regardless of the channel selected, the mobile terminal 104 will receive redirection information 503 (e.g. pointer data) which will enable it to tune to the all-announcement channel 5001 (step 504). The protocols used to redirect the mobile terminal 104 to the all-announcement channel and the protocols used to transmit the service announcements may be any one of the SAP/SDP, SAP XML or RTSP protocols. Once the mobile terminal 104 has tuned to the all-announcement channel 5001, it receives the service announcements identifying all services and the channel on which each service is available. The mobile terminal 104 may then select a service, causing the mobile terminal 104 to tune to the channel on which the selected service is available.

Define the amount of time it takes for the mobile terminal 104 to determine if it is receiving the all-announcement channel as Y seconds, and the time required to tune from one channel to another channel as T seconds. The learning time for the mobile terminal 104 to determine the all-announcement channel 5001 is Y seconds, and may be considered a minimum learning time. In the event that the mobile terminal 104 has not arbitrarily chosen the all-announcement channel 5001 initially, then the redirection information 503 of that channel redirects the mobile terminal 104 (step 504) to the all-announcement channel 5001. In this case, the learning time for the mobile terminal 104 to determine the all-announcement channel 5001 is 2Y+T seconds, and may be considered a maximum learning time. If the expected learning time for the mobile terminal 104 is defined to be the average of the minimum learning time and the maximum learning time, then the expected learning time is (3Y+T)/2. Furthermore, the additional bandwidth consumed by the redirection information 503 is negligibly small with respect to that consumed by the service announcements, defined to be W.

Figure 1:
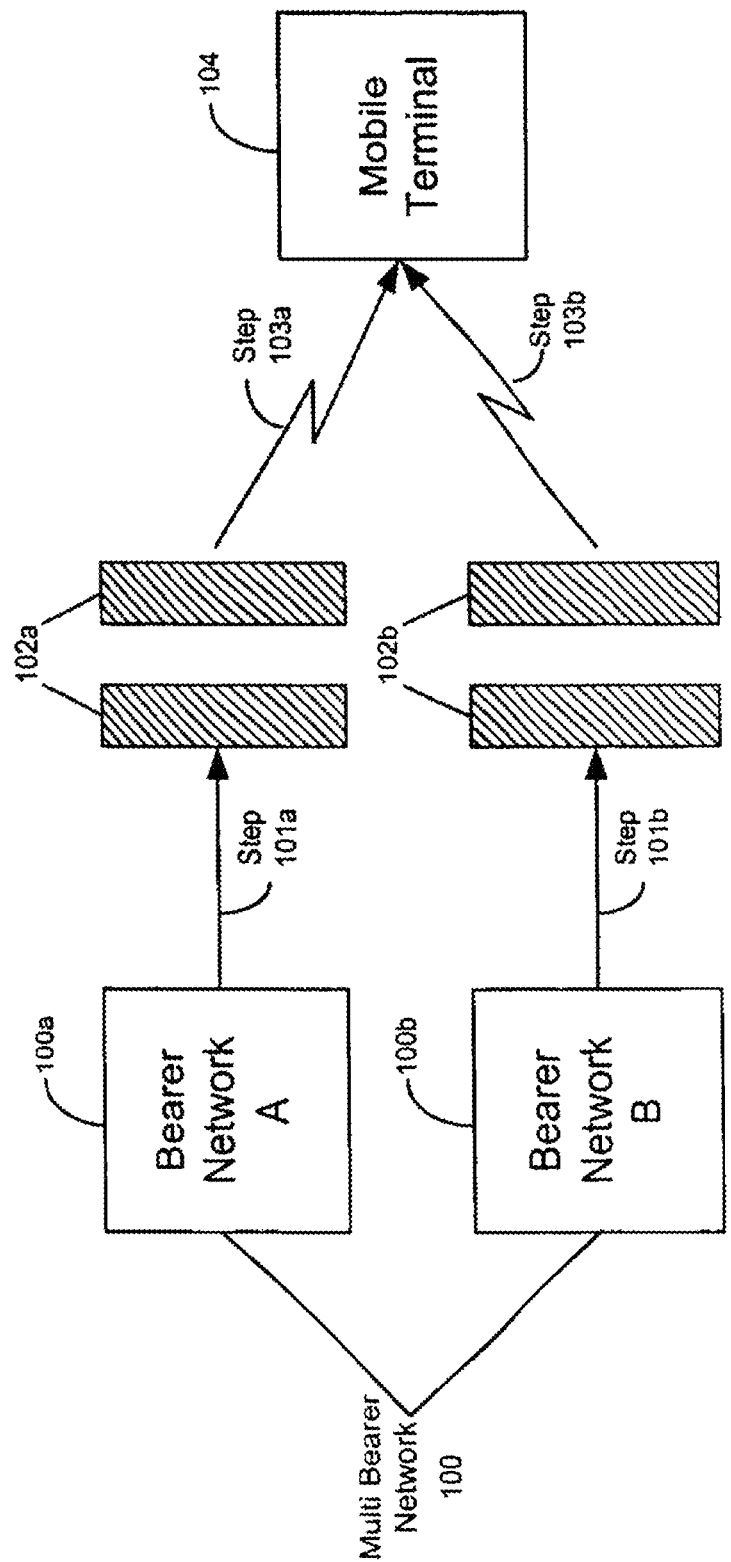
FIG. 1 shows an exemplary multi-bearer network, wherein the process of the present invention may be performed.
Figure 2:
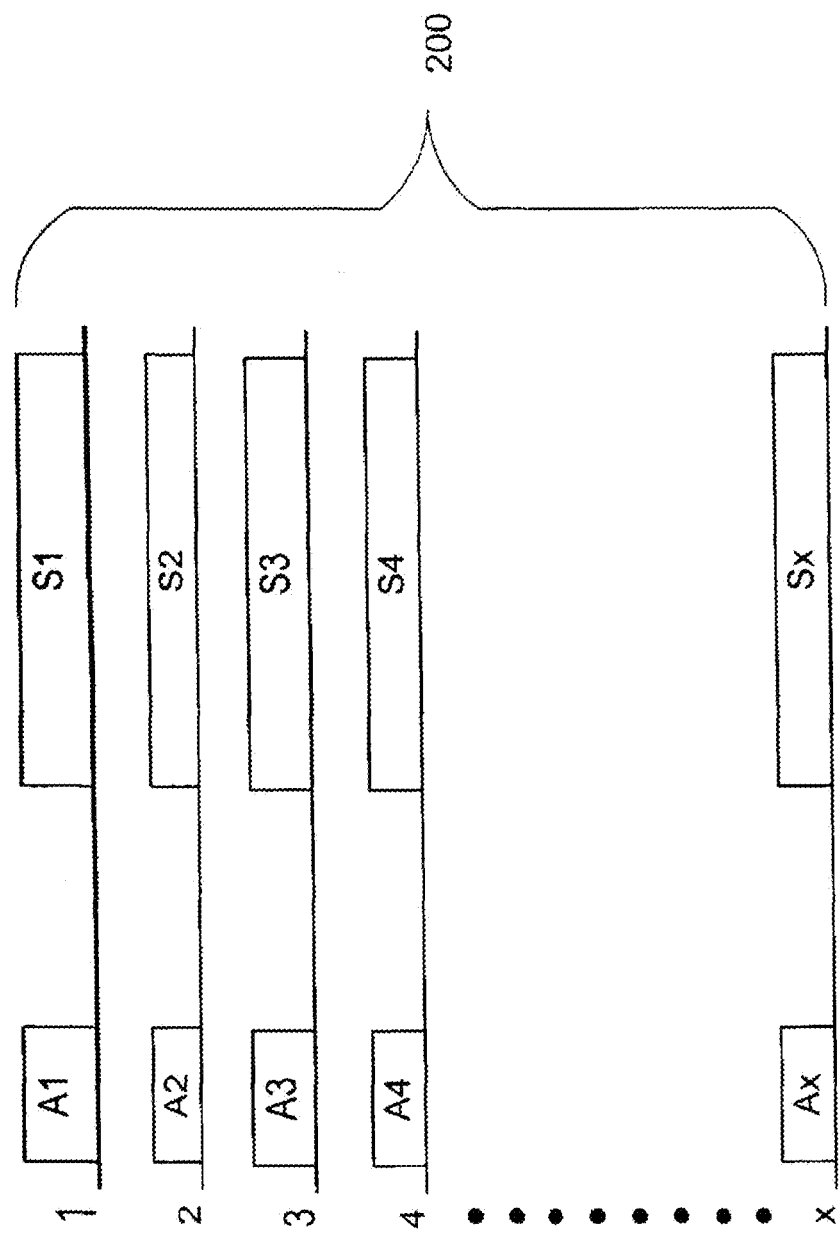
FIG. 2 illustrates an exemplary method of transmitting service announcements in the network of FIG. 1.
Figure 3:
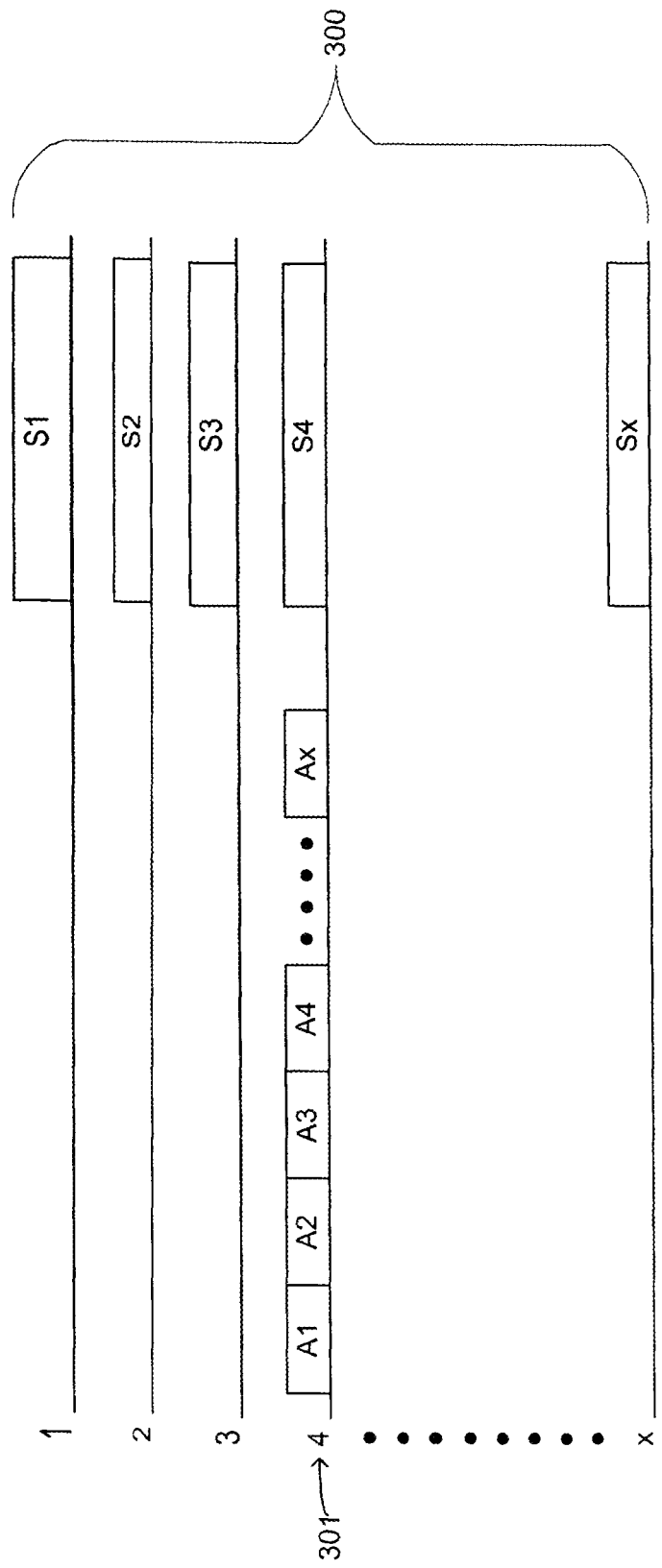
FIG. 3 illustrates another exemplary method of transmitting service announcements in the network of FIG. 1.
Figure 4:
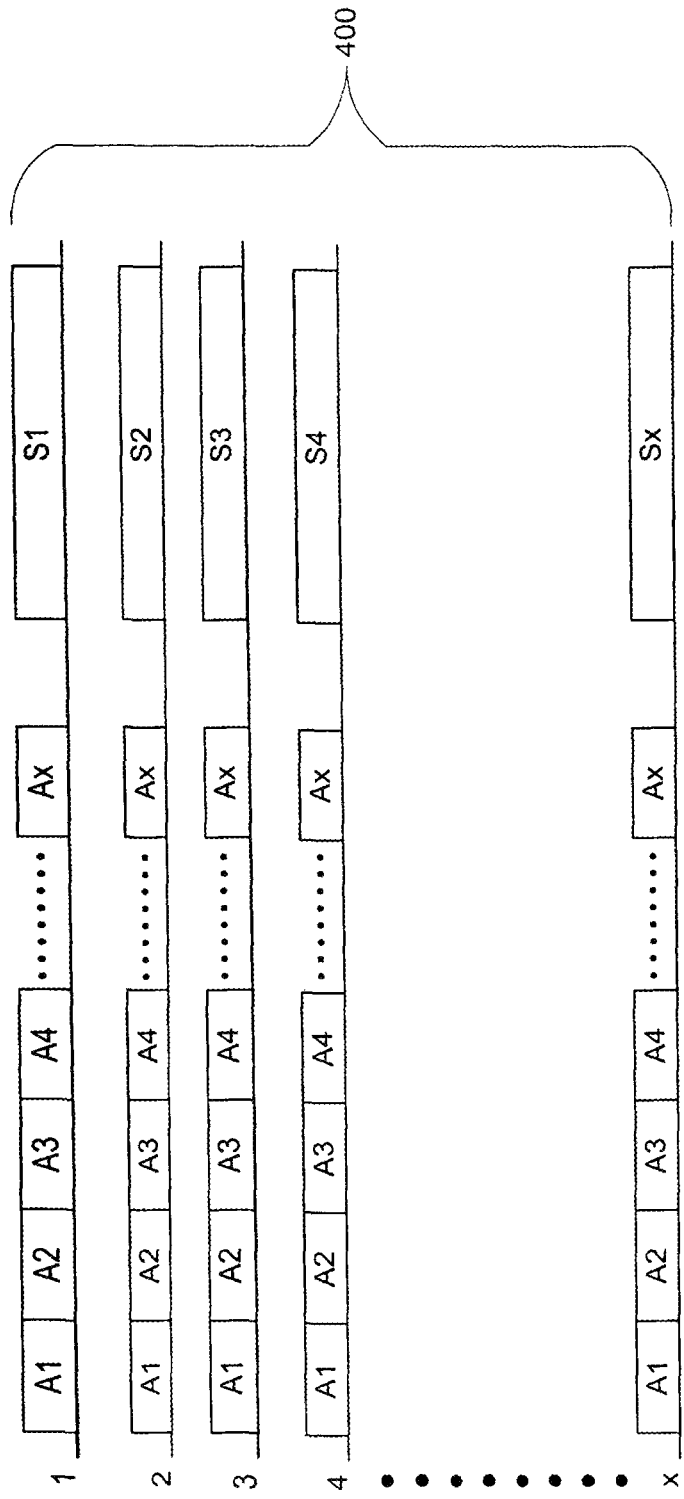
FIG. 4 illustrates yet another method of transmitting service announcements in the method of FIG. 1.

The expected learning time for the method illustrated in FIG. 5 is only slightly larger than that of the solution shown in FIG. 4, which has the smallest learning time of all of the methods illustrated in FIGS. 2-4. However, the additional bandwidth consumed by the service announcements as illustrated in FIG. 4 is very large, being W*X, as opposed to the additional bandwidth consumed by the method illustrated in FIG. 5, being W. Thus the method of FIG. 5 is clearly an advantageous method for transmitting service announcements over a multi-bearer network 100. Additionally, the efficiency of the method illustrated FIG. 5 increases as more channels are transmitting packet data 2 that the mobile terminal 104 is enabled to receive.

In this method, the service data is sent over a single-bearer network, but other embodiments may be suitable for multi-bearer networks, as will be discussed in detail in connection with FIG. 7.

Figure 6:
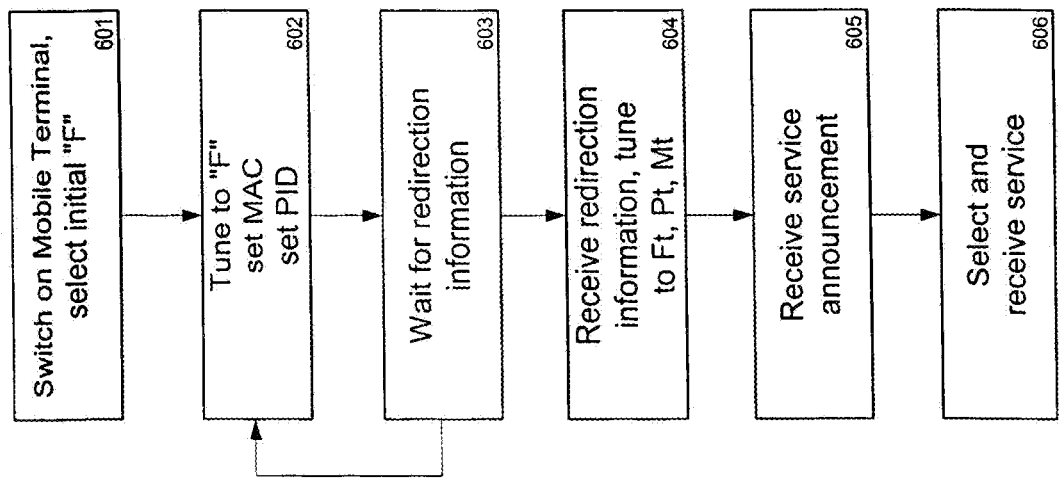
FIG. 6 is a flowchart illustrating an exemplary method by which a mobile terminal identifies service announcements in accordance with one embodiment of the present invention.

FIG. 6 is a flowchart illustrating an exemplary method by which a mobile terminal identifies service announcements in accordance with one embodiment of the present invention, wherein the single-bearer network is a DVB-T network. The mobile terminal 104 is switched on and begins searching for an all-announcement channel by selecting a start frequency, f, is selected (step 601). The search for this channel can be initiated by the user of the mobile terminal 104 at any time that the mobile terminal 104 is turned on, or it may be automatically initiated by the mobile terminal 104, e.g., upon approaching a new coverage area. The mobile terminal 104 then tunes to the frequency "f", sets Medua Access Control ("MAC") and Program Identifier ("PID") (step 602) and waits for redirection information 503 within a time period, defined to be "$T_1$" (step 603). The time $T_1$ may be defined by default, e.g., in the factory, or a user of the mobile terminal 104 can change the time $T_1$ by changing settings in the mobile terminal 104 using menu commands. The redirection information 503 contains information necessary for the mobile terminal to tune to the all-announcement channel 5001 and receive announcement information. Thus, the redirection information 503 may include the cell location information, cell ID, frequency, PID, MAC, bandwidth, fft, constellation, code rate, guard interval, hierarchy, hierarchical priority, and router address, which describe a DVB-T bearer network uniquely. Additionally, a source authenticator may be included with the redirection information 503. A source authenticator is data that is used to verify the authenticity of a sender. It is typically calculated by taking a secure hash over the entire message, signing the hash by the sender's private (secret) key and appending the result to the end of the original message, as is well known in the art. In the event that the redirection information 503 is not received within the time period $T_1$, then the mobile terminal 104, returning to step 601, tunes to another frequency, and again waits to receive redirection information 503 within a time period $T_1$. Steps 602 and 603 are repeated until redirection information 503 is received within a time period $T_1$ (step 604). Once the redirection information 503 is received, then, in step 604, the mobile terminal 104 tunes to the channel specified by the redirection information 503 as corresponding to the all-announcement channel 5001. The mobile terminal 104 then receives service announcements $A_1$ through $A_X$ (step 605), wherein service announcement $A_1$ identifies the service $S_1$ on channel 1, service announcement $A_2$ identifies the service $S_2$ on channel 2, etc. The mobile terminal 104 is tuned to the desired channel, causing the mobile terminal 104 to select specific tuning and filter parameters corresponding to the selected channel, in a manner well known to those skilled in the art, and thereby selects and receives the corresponding service available on the selected channel (step 606).

FIG. 7 illustrates the transmission of service announcements over a multi-bearer network 100 in accordance with one embodiment of the present invention. As shown in FIG. 7, at least a first bearer network 702 and a second bearer network 703 transmit service data to preferably a hybrid mobile terminal 104 capable of receiving service data from the first bearer network 702 and the second bearer network 703. In one embodiment of the invention, the hybrid mobile terminal can comprise two or more receivers corresponding to the bearer-types of the transmitting networks, as is described in detail in FIG. 8. In this embodiment, the first bearer network 702 transmits services using DVB, and the second bearer network 703 transmits services using USTM. However, this is not intended to be limiting. It will be understood that the mobile terminal 104 may be capable of receiving services from more than two bearer networks and that the bearer networks, rather than, or in addition to being, DVB and USTM, may be DAB, GSM, GPRS, UMTS, WLAN, Bluetooth or the like. Services are transmitted from the first and second bearer networks 702 and 703 to the mobile terminal 104 over X1 channels 700. However, some of the X1 channels are dedicated to the transmission of services by the first bearer network 702. These channels are marked in FIG. 7 as 1 through Y. The remainder of the X1 channels are dedicated to the transmission of services by the second bearer network 703. These channels are marked in FIG. 7 as Y+1 through X1. Each channel includes redirection information 704 which is used by the mobile terminal 104 to locate the service announcements $B_1$ through $B_{X1}$ for all X1 channels 700.

In this embodiment, however, there is a first all-announcement channel 705 and a second all-announcement channel 706. The first all-announcement channel 705 contains service announcements $B_1$ through $B_Y$, which correspond to services $S_1$ through $S_Y$ on channels 1 through Y. In other words, the first all-announcement channel 705 includes all service announcements for the transmissions by the first bearer network 702. The second all-announcement channel 706 contains service announcements $B_{(Y+1)}$ through $B_{X1}$, which correspond to services $S_{(Y+1)}$ through $S_{X1}$ on channels Y+1 through X1. In other words, the second all-announcement channel 706 includes all service announcements for the transmissions by the second bearer network 703.

Also in this embodiment, the redirection information 704 comprises a first redirection information 707 and a second redirection information 708. The mobile terminal 104 uses the first redirection information 707 to access the first all-announcement channel 705 (step 709) and also uses the second redirection information 708 to access the second all-announcement channel 706 (step 710). This method enables the mobile terminal 104 to access services provided by a plurality of bearer networks by utilizing an all-announcement channel for each bearer network. Alternatively, it is also possible to have a single all-announcement channel containing service announcements for all channels.

FIG. 8 depicts a block diagram of an exemplary mobile terminal 800 and, particularly, a mobile phone according to one embodiment of the present invention. As shown, the mobile terminal 800 includes a display, 802, such as an LCD display as is known in the art, a central processing unit (CPU) 804 and a memory 806. The mobile terminal also includes at least one receiver (808-814) (for receiving communication from a bearer network) connected to an antenna 816 and a keypad 818. The keypad 818 typically includes numerous function keys such as alphanumeric keys and directional (arrow) keys for scrolling among content contained in memory 806 or displayed on the display 802. The mobile terminal 800 also includes one more service access keys, which may be separate from the keypad 818, or part of the keypad 818, for initializing a search for services being transmitted over the various bearer networks.

It should be understood that the above description is only representative of illustrative examples of embodiments and implementations. For the reader's convenience, the above description has focused on a representative sample of all possible embodiments, a sample that teaches the principles of the present invention. Other embodiments may result from a different combination of portions of different embodiments. The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent.

What is claimed is:

1. A method, comprising:
   transmitting at least one digital audio or video broadcast service on a first channel; and
   transmitting pointer data on the first channel, wherein the pointer data identifies a second channel on which a service announcement identifying the service transmitted on the first channel is located,
   wherein the service is a compressed data stream, a weather report, a multicast service, a unicast service, a cell to session mapping, an Internet Protocol component mapping, or a combination thereof.

2. The method of claim 1, wherein the first channel and the second channel are frequencies.

3. The method of claim 2, wherein the pointer data includes the frequency of the second channel.

4. The method of claim 2, wherein the service announcement further identifies the frequency of the channel corresponding to the service.

5. The method of claim 1, wherein the transmitting are performed in accordance with at least one of the following protocols: digital video broadcasting, digital audio broadcasting, global system for mobile communications, general packet radio service, universal mobile telecommunications system, wireless local area network, and Bluetooth.

6. The method of claim 1, further comprising:
   transmitting at least one of a digital audio or video broadcast service on each of a plurality of channels; and
   transmitting pointer data on each of the plurality of channels, wherein the pointer data transmitted on each of the plurality of channels identifies a channel containing a plurality of service announcements identifying the services transmitted o each of the plurality of channels.

7. The method of claim 6, wherein each of the plurality of channels includes the channel containing the service announcements.

8. The method of claim 6, wherein the channel containing the plurality of service announcements identified by the pointer data is a frequency.

9. The method of claim 6, wherein the pointer data identifying the channel containing the plurality of service announcements includes information sufficient to permit a mobile terminal to access the service announcements.

10. The method of claim 9, wherein the information includes at least one of the following: a frequency, a PID, a MAC, a bandwidth, an fft, a constellation, a code rate, a guard interval, a hierarchy and a hierarchical priority.

11. A method, comprising:
    transmitting at least one digital audio or video broadcast service using a first protocol together with first pointer data on each of a first plurality of channels, the first pointer data identifying a first channel containing a plurality of service announcements identifying the services transmitted on each of the first plurality of channels; and
    transmitting at least one of a digital audio or video broadcast service using a second protocol together with second pointer data on each of a second plurality of channels, the second pointer data identifying a second channel containing a plurality of service announcements identifying the services transmitted on each of the second plurality of channels, wherein the service is a compressed data stream, a weather report, a multicast service, a unicast service, a cell to session mapping, an Internet Protocol component mapping, or a combination thereof.

12. The method of claim 11, wherein the first protocol and the second protocol are digital video broadcasting and digital audio broadcasting, respectively.

13. A method, comprising:
transmitting at least one digital audio or video broadcast service using a first protocol on each of a first plurality of channels;
transmitting pointer data on each of the first plurality of channels;
transmitting at least one of a digital audio or video broadcast service using a second protocol on each of a second plurality of channels; and
transmitting pointer data on each of the second plurality of channels, wherein the pointer data identifies a channel containing a plurality of service announcements identifying the services transmitted on the first plurality of channels and on the second plurality of channels,
wherein the service is a compressed data stream, a weather report, a multicast service, a unicast service, a cell to session mapping, an Internet Protocol component mapping, or a combination thereof.

14. A method, comprising:
receiving at least one digital audio or video broadcast service on a first channel; and
receiving pointer data on the first channel, wherein the pointer data identifies a second channel on which a service announcement identifying the service received on the first channel is located,
wherein the service is a compressed data stream, a weather report, a multicast service, a unicast service, a cell to session mapping, an Internet Protocol component mapping, or a combination thereof.

15. The method of claim 14, wherein the first channel and the second channel are frequencies.

16. The method of claim 15, wherein the pointer data includes the frequency of the second channel.

17. The method of claim 15, wherein the service announcement further identifies the frequency of the channel corresponding to the service.

18. The method of claim 14, wherein the receiving are performed in accordance with at least one of the following protocols: digital video broadcasting, digital audio broadcasting, global system for mobile communications, general packet radio service, universal mobile telecommunications system, wireless local area network, and Bluetooth.

19. The method of claim 14, further comprising:
receiving at least one of a digital audio or video broadcast service on each of a plurality of channels; and
receiving pointer data on each of the plurality of channels, wherein the pointer data received on each of the plurality of channels identifies a channel containing a plurality of service announcements identifying the services received on each of the plurality of channels.

20. The method of claim 19, wherein each of the plurality of channels includes the channel containing the service announcements.

21. The method of claim 19, wherein the channel containing the plurality of service announcements identified by the pointer data is a frequency.

22. The method of claim 19, wherein the pointer data identifying the channel containing the plurality of service announcements includes information sufficient to permit a mobile terminal to access the service announcements.

23. The method of claim 22, wherein the information includes at least one of the following: a frequency, a PID, a MAC, a bandwidth, an fft, a constellation, a code rate, a guard interval, a hierarchy and a hierarchical priority.

24. A method, comprising:
receiving at least one digital audio or video broadcast service using a first protocol together with first pointer data on each of a first plurality of channels, the first pointer data identifying a first channel containing a plurality of service announcements identifying the services received on each of the first plurality of channels; and
receiving at least one of a digital audio or video broadcast service using a second protocol together with second pointer data on each of a second plurality of channels, the second pointer data identifying a second channel containing a plurality of service announcements identifying the services received on each of the second plurality of channels,
wherein the service is a compressed data stream, a weather report, a multicast service, a unicast service, a cell to session mapping, an Internet Protocol component mapping, or a combination thereof.

25. The method of claim 24, wherein the first protocol and the second protocol are digital video broadcasting and digital audio broadcasting, respectively.

26. A method, comprising:
receiving at least one digital audio or video broadcast service using a first protocol on each of a first plurality of channels;
receiving pointer data on each of the first plurality of channels;
receiving at least one of a digital audio or video broadcast service using a second protocol on each of a second plurality of channels; and
receiving pointer data on each of the second plurality of channels, wherein the pointer data identifies a channel containing a plurality of service announcements identifying the services received on the first plurality of channels and on the second plurality of channels,
wherein the service is a compressed data stream, a weather report, a multicast service, a unicast service, a cell to session mapping, an Internet Protocol component mapping, or a combination thereof.

27. An apparatus, comprising:
at least one processor; and
at least one memory including computer program code for one or more programs,
the at least one memory and the computer program code configured to, with the at least one processor, cause the apparatus to perform at least the following,
transmitting at least one digital audio or video broadcast service on a first channel; and
transmitting pointer data on the first channel, wherein the pointer data identifies a second channel on which a service announcement identifying the service transmitted on the first channel is located,
wherein the service is a compressed data stream, a weather report, a multicast service, a unicast service, a cell to session mapping, an Internet Protocol component mapping, or a combination thereof.

28. The apparatus of claim 27, wherein the first channel and the second channel are frequencies.

29. The apparatus of claim 28, wherein the pointer data includes the frequency of the second channel.

30. The apparatus of claim 28, wherein the service announcement further identifies the frequency of the channel corresponding to the service.

31. The apparatus of claim 27, wherein the transmitting are performed in accordance with at least one of the following protocols: digital video broadcasting, digital audio broadcasting, global system for mobile communications, general packet radio service, universal mobile telecommunications system, wireless local area network, and Bluetooth.

32. The apparatus of claim 27, wherein the apparatus is further caused to:
transmitting at least one of a digital audio or video broadcast service on each of a plurality of channels; and
transmitting pointer data on each of the plurality of channels, wherein the pointer data transmitted on each of the plurality of channels identifies a channel containing a plurality of service announcements identifying the services transmitted on each of the plurality of channels.

33. The apparatus of claim 32, wherein each of the plurality of channels includes the channel containing the service announcements.

34. The apparatus of claim 32, wherein the channel containing the plurality of service announcements identified by the pointer data is a frequency.

35. The apparatus of claim 32, wherein the pointer data identifying the channel containing the plurality of service announcements includes information sufficient to permit a mobile terminal to access the service announcements.

36. The apparatus of claim 35, wherein the information includes at least one of the following: a frequency, a PID, a MAC, a bandwidth, an fft, a constellation, a code rate, a guard interval, a hierarchy and a hierarchical priority.

37. An apparatus, comprising:
transmitter configured to:
transmit at least one digital audio or video broadcast service using a first protocol together with first pointer data on each of a first plurality of channels, the first pointer data identifying a first channel containing a plurality of service announcements identifying the services transmitted on each of the first plurality of channels; and
transmit at least one of a digital audio or video broadcast service using a second protocol together with second pointer data on each of a second plurality of channels, the second pointer data identifying a second channel containing a plurality of service announcements identifying the services transmitted on each of the second plurality of channels,
wherein the service is a compressed data stream, a weather report, a multicast service, a unicast service, a cell to session mapping, an Internet Protocol component mapping, or a combination thereof.

38. The apparatus of claim 37, wherein the first protocol and the second protocol are digital video broadcasting and digital audio broadcasting, respectively.

39. An apparatus, comprising:
a transmitter configured to:
transmit at least one digital audio or video broadcast service using a first protocol on each of a first plurality of channels;
transmit pointer data on each of the first plurality of channels;

transmit at least one of a digital audio or video broadcast service using a second protocol on each of a second plurality of channels; and
transmit pointer data on each of the second plurality of channels, wherein the pointer data identifies a channel containing a plurality of service announcements identifying the services transmitted on the first plurality of channels and on the second plurality of channels,
wherein the service is a compressed data stream, a weather report, a multicast service, a unicast service, a cell to session mapping, an Internet Protocol component mapping, or a combination thereof.

40. An apparatus, comprising:
a receiver configured to:
receive at least one digital audio or video broadcast service on a first channel;
and
receive pointer data on the first channel, wherein the pointer data identifies a second channel on which a service announcement identifying the service received on the first channel is located,
wherein the service is a compressed data stream, a weather report, a multicast service, a unicast service, a cell to session mapping an Internet Protocol component mapping, or a combination thereof.

41. The apparatus of claim 40, wherein the first channel and the second channel are frequencies.

42. The apparatus of claim 41, wherein the pointer data includes the frequency of the second channel.

43. The apparatus of claim 41, wherein the service announcement further identifies the frequency of the channel corresponding to the service.

44. The apparatus of claim 40, wherein the receiver is further configured to perform the receiving in accordance with at least one of the following protocols: digital video broadcasting, digital audio broadcasting, global system for mobile communications, general packet radio service, universal mobile telecommunications system, wireless local area network, and Bluetooth.

45. The apparatus of claim 40, wherein the receiver is further configured to:
receive at least one of a digital audio or video broadcast service on each of a plurality of channels; and
receive pointer data on each of the plurality of channels, wherein the pointer data received on each of the plurality of channels identifies a channel containing a plurality of service announcements identifying the services received on each of the plurality of channels.

46. The apparatus of claim 45, wherein each of the plurality of channels includes the channel containing the service announcements.

47. The apparatus of claim 45, wherein the channel containing the plurality of service announcements identified by the pointer data is a frequency.

48. The apparatus of claim 45, wherein the pointer data identifying the channel containing the plurality of service announcements includes information sufficient to permit a mobile terminal to access the service announcements.

49. The apparatus of claim 48, wherein the information includes at least one of the following: a frequency, a PID, a MAC, a bandwidth, an fft, a constellation, a code rate, a guard interval, a hierarchy and a hierarchical priority.

50. An apparatus, comprising:
a receiver configured to:
receive at least one digital audio or video broadcast service using a first protocol together with first pointer data on each of a first plurality of channels, the first pointer data identifying a first channel containing a plurality of service announcements identifying the services received on each of the first plurality of channels; and receive at least one of a digital audio or video broadcast service using a second protocol together with second pointer data on each of a second plurality of channels, the second pointer data identifying a second channel containing a plurality of service announcements identifying the services received on each of the second plurality of channels, wherein the service is a compressed data stream, a weather report, a multicast service, a unicast service, a cell to session mapping, an Internet Protocol component mapping, or a combination thereof.

51. The apparatus of claim 50, wherein the first protocol and the second protocol are digital video broadcast and digital audio broadcast, respectively.

52. An apparatus, comprising:
a receiver configured to:
receive at least one digital audio or video broadcast service using a first protocol on each of a first plurality of channels;
receive pointer data on each of the first plurality of channels;
receive at least one of a digital audio or video broadcast service using a second protocol on each of a second plurality of channels; and
receive pointer data on each of the second plurality of channels, wherein the pointer data identifies a channel containing a plurality of service announcements identifying the services received on the first plurality of channels and on the second plurality of channels,
wherein the service is a compressed data stream, a weather report, a multicast service, a unicast service, a cell to session mapping, an Internet Protocol component mapping, or a combination thereof.

53. An article of manufacture, comprising:
a non-transitory computer readable medium including instructions for:
transmitting at least one digital audio or video broadcast service on a first channel; and
transmitting pointer data on the first channel, wherein the pointer data identifies a second channel on which a service announcement identifying the service transmitted on the first channel is located,
wherein the service is a compressed data stream, a weather report, a multicast service, a unicast service, a cell to session mapping, an Internet Protocol component mapping, or a combination thereof.

54. The article of manufacture of claim 53, wherein the non-transitory computer readable medium further includes instructions for:
transmitting at least one of a digital audio or video broadcast service on each of a plurality of channels; and
transmitting pointer data on each of the plurality of channels, wherein the pointer data transmitted on each of the plurality of channels identifies a channel containing a plurality of service announcements identifying the services transmitted on each of the plurality of channels.

55. An article of manufacture, comprising:
a non-transitory computer readable medium including instructions for:
transmitting at least one digital audio or video broadcast service using a first protocol together with first pointer data on each of a first plurality of channels, the first pointer data identifying a first channel containing a plurality of service announcements identifying the services transmitted on each of the first plurality of channels; and
transmitting at least one of a digital audio or video broadcast service using a second protocol together with second pointer data on each of a second plurality of channels, the second pointer data identifying a second channel containing a plurality of service announcements identifying the services transmitted on each of the second plurality of channels,
wherein the service is a compressed data stream, a weather report, a multicast service, a unicast service, a cell to session mapping, an Internet Protocol component mapping, or a combination thereof.

56. An article of manufacture, comprising: a non-transitory computer readable medium including instructions for:
transmitting at least one digital audio or video broadcast service using a first protocol on each of a first plurality of channels;
transmitting pointer data on each of the first plurality of channels;
transmitting at least one of a digital audio or video broadcast service using a second protocol on each of a second plurality of channels; and
transmitting pointer data on each of the second plurality of channels, wherein the pointer data identifies a channel containing a plurality of service announcements identifying the services transmitted on the first plurality of channels and on the second plurality of channels,
wherein the service is a compressed data stream, a weather report, a multicast service, a unicast service, a cell to session mapping, an Internet Protocol component mapping, or a combination thereof.

57. An article of manufacture, comprising:
a non-transitory computer readable medium including instructions for:
receiving at least one digital audio or video broadcast service on a first channel; and
receiving pointer data on the first channel, wherein the pointer data identifies a second channel on which a service announcement identifying the service received on the first channel is located,
wherein the service is a compressed data stream, a weather report, a multicast service, a unicast service, a cell to session mapping, an Internet Protocol component mapping, or a combination thereof.

58. The article of manufacture of claim 57, wherein the non-transitory computer readable medium further includes instructions for:
receiving at least one of a digital audio or video broadcast service on each of a plurality of channels; and
receiving pointer data on each of the plurality of channels, wherein the pointer data received on each of the plurality of channels identifies a channel containing a plurality of service announcements identifying the services received on each of the plurality of channels.

59. An article of manufacture, comprising:
a non-transitory computer readable medium including instructions for:
receiving at least one digital audio or video broadcast service using a first protocol together with first pointer data on each of a first plurality of channels, the first pointer data identifying a first channel containing a plurality of service announcements identifying the services received on each of the first plurality of channels; and
receiving at least one of a digital audio or video broadcast service using a second protocol together with second pointer data on each of a second plurality of channels, the second pointer data identifying a second channel containing a plurality of service announcements identifying the services received on each of the second plurality of channels, wherein the service is a compressed data stream, a weather report, a multicast service, a unicast service, a cell to session mapping, an Internet Protocol component mapping, or a combination thereof.

60. An article of manufacture, comprising:

a non-transitory computer readable medium including instructions for:

receiving at least one digital audio or video broadcast service using a first protocol on each of a first plurality of channels;

receiving pointer data on each of the first plurality of channels;

receiving at least one of a digital audio or video broadcast service using a second protocol on each of a second plurality of channels; and receiving pointer data on each of the second plurality of channels, wherein the pointer data identifies a channel containing a plurality of service announcements identifying the services received on the first plurality of channels and on the second plurality of channels, wherein the service is a compressed data stream, a weather report, a multicast service, a unicast service, a cell to session mapping, an Internet Protocol component mapping, or a combination thereof.

* * * * *